United States Patent [19]

Kazemzadeh

[11] Patent Number: 5,773,070
[45] Date of Patent: Jun. 30, 1998

[54] METHOD OF FORMING A SEMI-MOIST JERKY OR LEATHERY PET FOODS OR TREATS

[75] Inventor: Massoud Kazemzadeh, Bloomington, Minn.

[73] Assignee: MJM Technologies, Stacy, Minn.

[21] Appl. No.: 631,678

[22] Filed: Apr. 9, 1996

[51] Int. Cl.⁶ ..................................................... A23K 1/00
[52] U.S. Cl. ........................... 426/573; 426/516; 426/518; 426/805
[58] Field of Search ............................ 425/812; 426/516, 426/518, 573, 574, 805

[56] References Cited

U.S. PATENT DOCUMENTS

| | | | |
|---|---|---|---|
| 1,927,041 | 9/1933 | Mayhew | 99/16 |
| 3,202,514 | 8/1965 | Burgess et al. | 99/2 |
| 3,486,469 | 12/1969 | Wattignies | 107/54 |
| 3,653,908 | 4/1972 | Buck et al. | 426/516 |
| 3,718,484 | 2/1973 | Glabe | 99/199 |
| 3,745,022 | 7/1973 | Broeg et al. | 99/134 |
| 3,806,617 | 4/1974 | Smylie et al. | 426/380 |
| 3,833,413 | 9/1974 | Glabe et al. | |
| 3,906,114 | 9/1975 | Glabe et al. | 426/641 |
| 3,962,462 | 6/1976 | Buckwall, Jr. et al. | 426/516 |
| 4,143,172 | 3/1979 | Mitchell et al. | 426/577 |
| 4,228,195 | 10/1980 | Priegnitz | 426/321 |
| 4,324,811 | 4/1982 | Eugley | 426/656 |
| 4,444,796 | 4/1984 | Ueno et al. | 426/335 |
| 4,731,007 | 3/1988 | Schiek | 425/812 |
| 4,784,867 | 11/1988 | LaBaw et al. | 426/309 |
| 4,868,002 | 9/1989 | Scaglione et al. | 426/516 |
| 4,904,495 | 2/1990 | Spanier | 426/646 |
| 4,910,038 | 3/1990 | Ducharme | 426/641 |
| 5,026,572 | 6/1991 | Neilberger | 426/516 |
| 5,290,584 | 3/1994 | Ray | 426/516 |
| 5,296,247 | 3/1994 | Huang et al. | 426/516 |
| 5,296,253 | 3/1994 | Lusas et al. | 426/629 |
| 5,300,312 | 4/1994 | Lusas et al. | 426/634 |
| 5,500,239 | 3/1996 | Hayward | 426/516 |

OTHER PUBLICATIONS

Correlation Between Glass Transition Temperature and Starch Retrogradation in the Presence of Sugars and Maltodextrins, Y.J. Wang and J. Jane, vol. 71, No. 6, 1994, pp. 527–531.

Desrosier, The Technology of Food Preservation, 4th Ed., P291, AVI Pub. Co., Westport, Conn. (1977).

*Primary Examiner*—Allan R. Kuhns
*Attorney, Agent, or Firm*—Merchant, Gould, Smith, Edell, Welter & Schmidt, P.A.

[57] ABSTRACT

A formulation and process to produce a pet food or treat that has been reshaped to various sizes and shapes such as strips, pellets, sheets, etc., from the addition of a number of raw ingredients which were mixed and heated and fused together to form a continuous matrix which remains flexible and non-brittle at low moistures of 20–40%, water activity of 0.30–0.65, and having a low glass transition compound as the major adhesive component of the matrix, thus being stable at minimum or no packaging atmosphere at room temperature is herein described. The process is carried out in a twin-screw, self-wiping, corotating and intermeshing extruder.

5 Claims, 1 Drawing Sheet

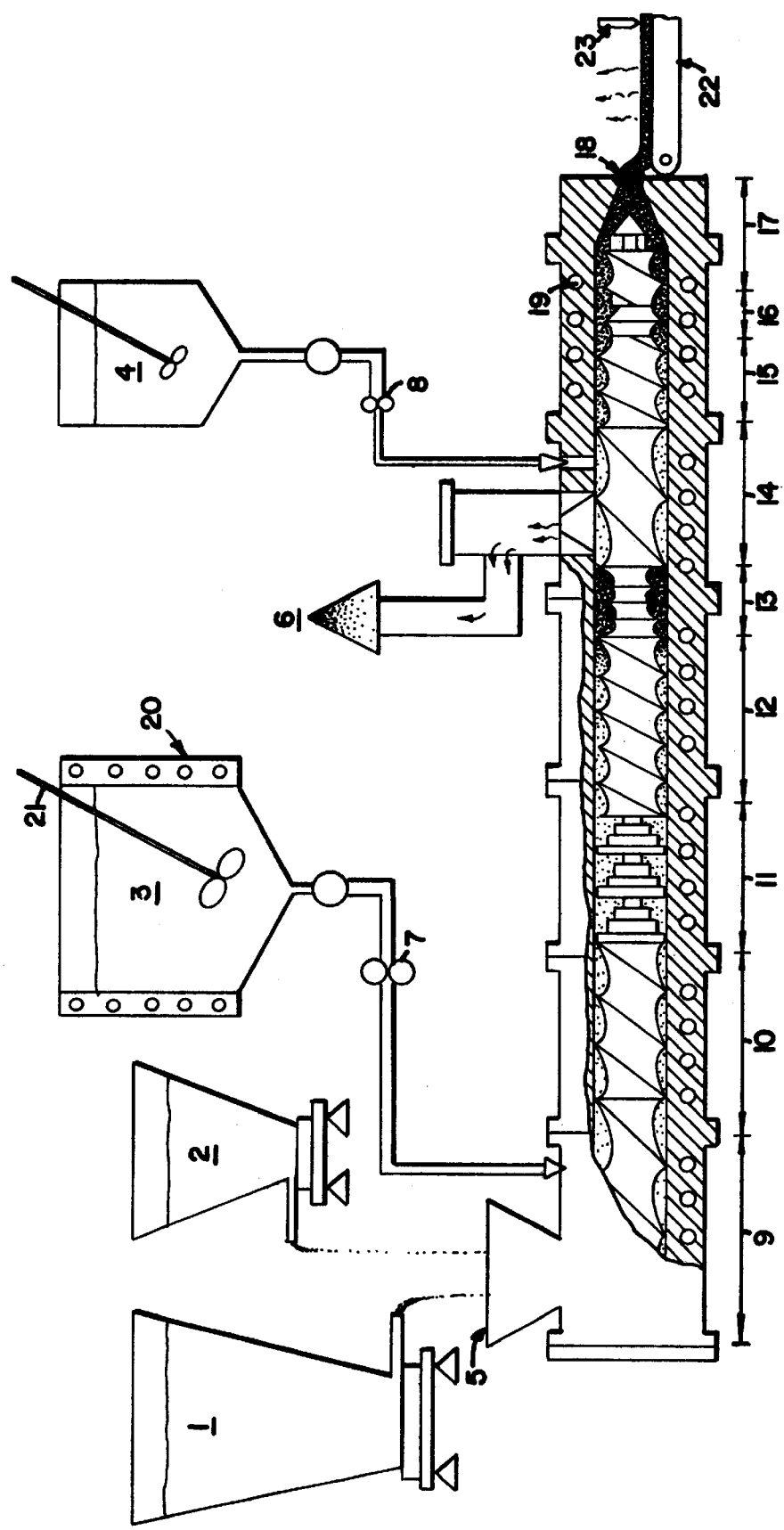

5,773,070

METHOD OF FORMING A SEMI-MOIST JERKY OR LEATHERY PET FOODS OR TREATS

FIELD OF THE INVENTION

This invention is related to a semi-moist pet food or pet treat product and an extrusion process for preparing the product which can have as described a flexible or jerky-like characteristic with a chewy or leathery texture.

BACKGROUND OF THE INVENTION

Developments in this field have a long history, with most dealing with the concept of a humectant being added to a matrix in order to entrap the water molecules to an extent that the osmotic pressure of the product matrix exceeds the atmospheric osmotic pressure, thus making the product flexible and chewy under normal packaging conditions and medium moisture.

U.S. Pat. No. 1,927,041 describes a process and a formulation of a candy and method of making the same that yields a product for improved licorice candy that has a flexible texture.

U.S. Pat. No. 3,202,514 relates to a novel food for animals, and the method for making the same. More particularly, it relates to a novel animal food characterized by a high degree of palatability, high nutritional and caloric value, and the faculty of being stored and marketed in substantially non-refrigerated conditions, without the need for commercial sterilization in hermetically sealed packages. The patent describes the product as a meat-based, palatable moist animal food composition of substantially neutral pH of 6.0 to 8.0, and adapted to be packed in non-hermetic packaging material without sterilization and stored for long periods without refrigeration. Its matrix is described as an aqueous solution of water soluble solids, including sugar incorporated in a set matrix material in a bacteriostatic amount, with moisture levels less than 30%, and greater than 15% by weight, thereby imparting plasticity to the composition. The level of water soluble sugar solids being greater than 15% and up to 35% by weight of set composition. The remaining percentage of the matrix may be filled with proteinaceous, meaty products.

U.S. Pat. No. 3,486,469 describes a method of the continuous processing of ingredients for the manufacturing of boiled, sugar-based confectionery comprising the steps of heat treating a sugar-containing syrup-like mixture in the form of a thin layer of 1–2 mm simultaneously subjecting this layer to a vigorous stirring action, at temperatures of 160°–185° C. over a limited time period of from 4–5 sec. to avoid inversion. The end product as described in this patent may be further manipulated to form a sticky, chewy, pliable texture.

U.S. Pat. No. 3,745,022 describes a dry mix for a grain confection product, comprised of sugar and fat, having a setting point in the range of from above about room temperature to about 110° F., and having a rapid crystallization rate. By further processing, a semi-solid candy-like product can be achieved which would be pliable and sticky.

U.S. Pat. No. 3,718,484 describes a dehydrated, high fructose corn syrup by slurring the syrup with ungelatinized starch, having a gelatinization temperature of at least 150° F., heating the slurry at 15° to 30° below the gelatinization temperature of the starch. This would condition the starch so that it would only partially gelatinize when the slurry is dried. The final texture of the product is considered to be chewy and pliable.

U.S. Pat. No. 3,806,617 describes a process for preparation of licorice-like candy, producing a licorice candy by rapidly drying a cooked licorice-like candy formulation in a thin film at a temperature of between 250°–255° F. and between two rotating circular surfaces, removing the dried film, shaping and cooling the shaped, dried product. The texture of the final product mimics a stiff licorice candy.

U.S. Pat. No. 3,833,413 describes a product which is achieved by solidifying high fructose corn syrup by the addition of high water soluble soy protein to form a slurry prior to dehydration, and enhances the crispness and rapidity of crystalline formulation when the slurry is subsequently dehydrated as a thin film on a heated surface.

U.S. Pat. No. 4,324,811 describes a product of dough-like consistency, exhibiting reduced water activity, comprising a mixture of derived protein-containing composition and particularly a deproteinated, mineralcontaining whey by-product and starch at a moisture content of from about 20% to 50% by weight. These products are classified as base material for intermediate moisture food.

U.S. Pat. No. 4,444,796 describes a method for producing a pet food with good storage stability, having a water content of 20% to 45% by weight, and a pH of 6.0 or below, which comprises admixing granules having particle diameter of 300 to 1500 microns, and comprising as a main ingredient a fine powder of sorbic acid with a starting material for the pet food, and heating these materials simultaneously with or after the mixing.

U.S. Pat. No. 5,026,572 describes a method of making a jerky-type product using multiple extrusion steps. First, a blend of wet beef product and high protein flour are mixed and then cooked by extruding the first blend at a temperature sufficient to at least partially cook the beef in the first blend. The second blend is formed, which includes the extruded product of the first extrusion step, and the additional wet beef. The second blend is then cooked by extruding the second blend at a temperature sufficient to cook the wet beef in the second blend. The end product is finally blended and processed into jerky form, having a jerky type texture.

U.S. Pat. No. 5,296,253 describes a method of producing an edible, shelf-stable legume and/or cereal food product, comprised of inactivated microorganisms, lectins, enzymes, trypsin inhibitors, and hemagglutinins, while increasing protein and starch digestibility and palatability. The end product has a water activity of 0.65 to 0.87, pH of 4.0 to 6.0, and a moisture content of 20 to 45% by weight.

U.S. Pat. No. 5,300,312 describes a method of producing a ready to eat, intermediate moisture texturized protein foodstuff, which simulates meat, and has an extended shelf life. The product is comprised of pretexturized vegetable protein source with a first source of water such as meat, meat by-products, or other liquids by cooking/extrusion combining the texturized fractions with other ingredients in a second extrusion step. Shelf stability of this product is achieved through control of free water content and activity of the product.

The above illustrates that the concept of a leathery or jerky-like product containing various levels of proteins and carbohydrates, even cellulose, with various other additives to keep the water activity of the finished product low, has been extensively investigated. The ideal product in the pet treat or food market would be to produce a constructed product with similar ingredients as, for example, leathery or flexible products such as licorice, jelly bean, fruit leather or fruit jerky, and come up with a consistency of texture and the mouth feel of the leathery or jerky type texture. The product becomes even more difficult to produce from a starch based raw product with similar characteristics. In most cases, this can be observed in, for example, freshly baked bread whereby the texture of the product is very soft and cushion-like while, as the product ages, the soft consistency gives way to the hard and rigid texture. This phenomenon is due to a number of factors, among which are the retrogradation of the starchy material as well as the change within the matrix make up due to expulsion of the moisture or the rearrangement of the certain components of the matrix whereby the matrix components rearrange themselves to produce the state of entropy. Use of special chemicals infused into the particulates matrix has shown some success in the stabilization of the matrix, but some of these chemicals have proven themselves to be detrimental to the health of most pets and animals. These include the use of propylene glycol; glycerines; polyhydroxyl compounds; small, polymer-like dextrins; or solubilized starches and proteins, etc.

The presence of water in the pet foods in different degrees makes it possible to classify the various pet foods into four classes. First are the low moisture foods containing less than about 15% by weight moisture, which are known as dry pet foods and are shelf stable because the water activity at the range of 0.2 to 0.4 does not lend itself to mold and bacterial growth. These products do not need to be aseptically canned or preserved due to their stability by their chemical characteristics. Second are the high moisture containing pet foods having about 85% by weight moisture, and which require aseptic canning for preservation. These are the well known canned pet foods. Third are the semi-moist or intermediate moisture pet foods containing moistures in the order of 20%–40%. These products are generally characterized by a soft, crumbly texture and densities comparable to meat or leathery products. Even though the high moisture content of these products would normally render them susceptible to mold and bacterial growth, these products have been rendered stable by inclusion of various acids and solutes, thereby altering the pH and also decreasing the water activity (Aw) to a level which prevents mold and bacterial growth. The fourth category of pet foods includes meat treats. These pet treats or pet jerkies are distinguished from conventional dry pet foods both by composition and in the method of preparation. Since the starting mixtures for these products are high in moisture, after processing, the product yields typically range from 40%–45%. These products are packaged for room temperature with little need for refrigeration or special packaging. These products are chewy, low to intermediate moisture, and relatively dense compared to conventional dog or cat foods or even semi-moist foods. These products are shelf stable due to low water activity (Aw) resulting from the reduced moisture content as the product is dried during processing. The major characteristics of such jerkies are their soft, pliable and cohesive nature, yet their major disadvantage is their high cost of preparation/processing and the high cost of starting raw material.

Water activity is a concept that differs from that of absolute water content of a food particle. Some foods may contain high levels of total water content while at the same time demonstrate low water activity. For this reason the water activity of a food particle can be defined as the ratio between the vapor pressure of water in food (VP) to the vapor pressure of pure water at room temperature (VPo) and a specified atmospheric pressure (Desrosier, *The Technology of Food Preservation*, 4th Ed., P291, AVI Pub. Co., Wesport, Conn. (1977)).

$Aw=VP/VPo$

This ratio defines the amount of free water present in the food expressed as the equilibrium state of the unbound water content in relation to the vapor pressure of the surrounding environment in which the food is stored, under conditions of room temperature and atmospheric pressure. In another sense, the water activity is affected by the amount of solvent, in most cases water, present in the product, and the competition for that water by all solutes as indicated by the colligative property of osmotic pressure.

Salts are considered to be the most effective ingredients per unit weight to increase osmotic pressure and decrease water activity. This is due to the low molecular weights, and they often dissociate into two or more ions, each of which contributes to the osmotic pressure as a short-chain molecule dissolved therein.

It is determined that the relative effectiveness of molecules in reducing the water activity per gram of solute decreases as their molecular size increases. Similarly, this also occurs when going from dissociated salts to polyhydroxyl compounds containing 3C-compounds like glycerol and propylene glycol, to 6C-compounds like dextrose, fructose and sorbitol, to 12C-compounds like sucrose and maltose or small polymers like dextrins or solubilized starches and proteins. Usually the use of lower pH of 4–5.5 or lower discourages the growth of bacteria and enhances solubility of antimicrobial compounds such as potassium sorbate. Propylene glycol has antimicrobial characteristics as well as acidulates such as citric acid, acetic acid, formic acid, etc.

Glass transition temperature of a compound is defined as the point or energy level at which the compound is transformed from solid crystalline form into an amorphous, continuous form. This characteristic is different for different compounds and at different moisture levels. This phenomenon is especially true for food based components such as starch and proteins. In starches, the point of total gelatinization of the starch granule is considered to be the melting point or the glass transition point of the starch and this point is directly dependent on the moisture content within the granule. As the moisture is reduced, for example, for a wheat starch from 10% to 5% the gelatinization temperature changes from 85° C. to 230° C. and below 4% moisture the gelatinization of wheat starch cannot be measured due to very high temperatures required to achieve such a state of entropy.

The present invention involves the utilization of low glass transition compounds as the matrix builder and the softening agent coupled with the lowering of the water activity and lowering the amount of water needed to achieve such characteristics at room temperature and atmospheric pressure. The adhesive characteristics of these compounds at lower water activity provide for a leathery or jerky-like texture which can be used for the marketing and manufacturing of pet treats and foods made from blends of fruit purees, and starches, proteins and cellulose.

SUMMARY OF THE INVENTION

The present invention includes the use of a low glass transition medium (amorphous at room temperature) in conjunction with water in order to produce a cohesive matrix inclusive of various proteins, starches, carbohydrates and cellulose as well as various sources of the above ingredients, including meat or animal tissue, plant tissue, fruit purees, as well as synthetically produced compounds from the above list of ingredients as fat replacers or as humectants and deliquescents, to form a continuous matrix possessing a flexible or jerky-like characteristic with chewy or leathery texture, shaped in various configuration including bars, pellets, sheets, and any derivatives of such for the pet food and treat industry.

The present invention also includes a method for producing a pet food or treat product using a twin screw extruder, which is self wiping, corotating and intermeshing, in a multi-zone process area whereby the product is thoroughly mixed, partially dried and cooled, and formed in a continuous manner, and then deposited on rollers for further processing or cut at the die to form the finished product.

Accordingly, the invention is a method for producing a semi-moist pet food or treat product having a flexible or jerky-like characteristic with a chewy or leathery texture comprising carrying out in a twin-screw, self-wiping, corotating and intermeshing extruder the steps of:

(a) kneading a mixture comprising a filler, a hydrocolloid and a liquid binder having a glass transition temperature of less than about +10° C. at a temperature of about 175° to 250° F. to form a dough-like mixture;

(b) venting off under reduced pressure water and other volatiles;

(c) cooling the dough-like mixture to about 0° to 150° F.; and (d) conveying the product through a die onto a conveyor belt for cutting and packaging.

Another aspect of the invention is a pet food or pet treat product prepared by the above method having a moisture content of about 20 to 40%, a water activity of about 0.35–0.65 and a glass transition temperature of less than about +18° C.

The present invention allows the pet food and treat manufacturer to utilize in their formulation other ingredients with low glass transition in order to produce the same textural characteristics as the high moisture or jerky type product would use. It also allows the producers not to depend on only meat as the starting raw material, but to use ingredients with much lower cost and varieties including various mixtures of starches and cellulose as well as proteins and fruit purees. In the same light, this approach to the texture development does not require special packaging to insure the preservation of high humidity within the product matrix. The product of the present invention contains low glass transition raw materials provided from purees of fruits or components of cereals, vegetables or meats or synthetically prepared from various sources, such as glycerin, modified fats and oils, corn or rice syrups holding together the mixtures of grains and cereals and proteins as well as other ingredients commonly used in the pet food or treat industry such as gums and hydrocolloids and various modified carbohydrates. The most outstanding benefit of this product/process is its capability to mimic the jerky-like texture by the use of a wide variety of raw materials as fillers and a wide variety of low glass transition media as a binder. The end product having a moisture content of 20%–40% is classified as neither low water nor intermediate moisture foods, but as a semi-dried or semi-moist food with water activity of 0.35–0.65 and requiring no special packaging in order to be shelf stable at room temperature and atmospheric pressure.

BRIEF DESCRIPTION OF THE FIGURE

The FIGURE illustrates the multi-zone extrusion process used to prepare the pet food or pet treat product.

DETAILED DESCRIPTION OF THE PREFERRED EMBODIMENT

The present invention relates to animal or pet foods that are composed of proteins, starch, cellulose, hydrocolloids, and other minor ingredients common to pet food or treats having animal, plant or cereal and fruit sources. While the development and production of nutritious animal and pet foods and treats are well understood by those skilled in the art, there is a continuous problem of making these foods pliable, palatable and, in most treat-like pet foods, flexible as well under normal atmospheric conditions. In order to counteract these problems, most manufacturers rely on packaging of high moisture foods with high water activity. These foods have a limited shelf life, and require specific packaging criteria to prevent them from losing moisture. The use of high fat and certain humectants, such as salts, has been successful in achieving the desired characteristics of pliability and flexibility in these products. Most pet food components, other than starch and cellulose fiber, can be manipulated by the addition of the above cited ingredients.

The components starch and fiber are very similar in their chemical make-up, in that they both are polymers of hydrocarbon, and the only difference is in the way the molecules of glucose are attached to each other. Starch and fiber are always rigid in low humidity, and usually do not have much affinity toward high moisture. In the presence of high moisture, however, these two components of pet food tend to become plasticized and pliable. The main focus of this invention is to provide enough moisture within the starch, protein and cellulose matrices, or to incorporate within the initial formulation components and ingredients that either by themselves or in the presence of low moisture, using a twin screw, corotating, cooking extruder, to fully plasticize and link them through hydrogen and other types of bonding having a hydrocolloidal and deliquescent type of characteristic.

In order to maintain such a matrix in a flexible format, it is necessary to use compounds which are water soluble and contain a very low glass transition point as additions to the matrix. The low glass transition compounds will form an interactive phase with water, starch, proteins, cellulose and the hydrocolloid compounds, thus forming a condition where, upon evaporation of most of the water molecules, the low glass transition compounds replace the active sites of water, thus behaving as hinging points for the molecules to become flexible.

Hydrocolloids accomplish a number of tasks within the matrix, the most important of which is the prevention of gelatinized starch from retrograding to granular form thus expelling water and making the product rigid or brittle. Hydrocolloids also provide a means of achieving a continuous matrix whereby water molecules are well dispersed and remain within each component.

The two major components of starch are amylose and amylopectin. Amylopectin, being a highly branched molecule, tends to form an extensive, intertwining and cross hydrogen bonding with other starch molecules at the point of total gelatinization. This results in the formation of a very brittle and crunchy matrix and end product. However, the amylose portion of the starch, being linear in configuration, does not form an extensive matrix, and tends to be flexible in nature. This invention can use high amylose starch in combination with hydrocolloids and deliquescent compounds, having sources from animal tissue, cereal plant components or fruits coupled with very low glass transition compounds, to form a final product that is low in water activity (Aw), requiring no special packaging and remaining flexible at room temperature conditions. A number of low glass transition compounds have recently been introduced into the market under the designation of fat replacers. Examples of these include FruitTrim (by Fruit Source Associates, Santa Cruz, Calif.), OatTrim (by Canadian Harvest, Cambridge, Minn.), and other hydroxypropylated high-amylose fat replacers, coupled with xanthan gum as a moisture retainer. These compounds act as fat replacers by highly compounding with water molecules, which in their normal state of existence have a very low glass transition point, thus providing an amorphous phase at room temperatures.

The semi-moist pet food or pet treat comprises three basic components: a filler, a hydrocolloid source and a binder where the three components are mixed in a twin-screw extruder, heated and kneaded to a doughy-like consistency. Additional components such as a flavoring source and additional water may be added depending on the product to be produced and its desired texture.

Preferably, the product contains about 9–28 wt-% filler which in turn contains about 3–12.5 wt-% of amylose starch based on the total weight of the product. The hydrocolloid source may be contained in the product from about 0.5–4 wt-% and the binder comprising a major portion of the product is about 34–83 wt-%. When a flavoring source is desired in the product, such a source is contained in about 0.1–3 wt-%. Additional water up to 4 wt-% may be added as well.

As the filler component in the pet food or pet treat product, the following is illustrative of materials employable and is not a limitation for purposes of the invention. These are, for example, flour, starch, pre-gelled starch, sugars, fibers such as cellulose, bran and the like, fruit solids, fruit fibers, meat solids (dehydrated meats), spray dried meat protein and the like.

As a source of hydrocolloids, these include gums, e.g., guar gum; alginates, pre-gelled starches, pre-gelled flour, gelatin, modified celluloses, such as carboxymethylcellulose and the like.

As the major component of the continuous matrix product, the binder having a glass transition of at least below +10° C. includes meat-based purees, fruit-based purees, fat-based purees, sugar-based purees, sugars, syrups, honey and the like.

This type of reconstructed product can be formed into a wide variety of shapes and sizes, such as flexible worms as treats for birds, or meat analog bits which are chewy treats for dogs and cats, or fruit based sticks or sheets or pellets.

In order to achieve a well-mixed, continuous texture within the matrix, it was noted that the use of a twin screw, corotating, intermeshing, self-wiping extrusion system is of primal importance. The process includes dividing the extrusion process into distinct processing areas. The first stage of the process is to premix, heat and knead to a doughy consistency a mixture of the filler, hydrocolloid and binder to about 175°–250° F. This stage is then followed by the venting of water and volatiles followed by the optional addition of flavoring agents. In the last stage of the process, the matrix is cooled to temperatures of about 0° to 150° F., whereby the product is cooled and the extruder barrel is cooled/frozen to jell the matrix into a continuous and jerky-like product. An illustration of the process is shown in the Drawing.

The process may be described in more detail by reference to the Drawing. Filler material 1 and hydrocolloid source 2 are fed from tumblers into a feeding port 5 of the extruder and mixed. The binder is in a heat-jacketed kettle 20 which is mixed with a propeller or rotary mixer 21. The binder liquid having a glass transition of less than +10° C. is added from vessel 3 through high viscosity metering pump 7 into feeding zone 9 of the extruder and mixed with the mixture of filler and hydrocolloid. The addition may take place at room temperature or from anywhere from about 70°–220° F. The mixture is conveyed through conveying zone 10 into mixing zone 11 and heated to a temperature of about 150°–250° F., preferably at about 200°–225° F. The mixture is then conveyed through another conveying zone 12 to a kneading zone 13 where the kneading takes place at a temperature from about 175°–250° F., preferably at about 225° F. Following the kneading, the water and volatiles are removed under reduced pressure in a low pressure venting zone 14 where the volatiles are vented through vacuum port 6. At this point, depending on the desired product, a flavoring source 4 may be added through a high pressure pump 8 in area 14. Conveying and cooling then is begun in conveying zone 15 where the mixture is cooled to about 0° to 150° F., preferably at about 0° F. and into a high viscosity mixing zone. Cooling is performed through cooling channels 19. Once the formulation is completed, the viscosity of products is extremely high in the order of 0.5–10 million centipoise, thus requiring twin-screw extender which is intermeshing and self-wiping to provide for continuous mixing and partial dehydration and matrix formation to take place. Following the cooling and high viscosity mixing, the resulting product is compressed in zone 17 and passed through die 18 and deposited on a conveyor belt 22 and then cut by cutter 23 and then packaged or further shaped as desired.

The following examples are illustrative of the present invention and its development.

EXAMPLE 1

Buhler's corotating, self-wiping, intermeshing, 62 mm, twin screw extruder, with 24 L/D was used in this process. A special screw configuration was designed to shear and mix the product thoroughly within the first three barrels, followed by venting and cooling at the fourth barrel, and the addition of a flavoring agent followed by mixing and cooling of the product before leaving the die. The product exiting the die was placed on a conveyor belt to further cool and set. At the end of the belt, it was cut to the desired length.

| Ingredients | Amount (wt-%) |
| --- | --- |
| Dried Fruit Pieces | 35.0 |
| Tapioca Starch | 2.0 |
| Water | 54.0 |
| Calcium Sulfate | 0.5 |
| Xanthan Gum | 0.1 |
| Alginate | 0.75 |
| Sugar | 4.0 |
| Rice Flour | 1.0 |
| Sodium Chloride | 0.1 |
| Potassium Sorbate | 0.1 |
| Calcium Lactate | 2.2 |
| Sodium Acid Pyrophosphate | 0.05 |
| Lactic Acid, 85% | 0.2 |

The above recipe was prepared in two separate mixes, in which the second mix included calcium lactate, sugar, lactic acid, calcium sulfate, potassium sorbate, and this mix was added at the fourth section of the extruder to be followed by further mixing and cooling. The result of this formula was a leathery, textured product with a strong internal matrix. Upon dehydration at room temperature, the product exhibited elasticity and tougher texture than the standard fruit leather.

EXAMPLE 2

| Ingredients | Amount (wt-%) |
|---|---|
| Fruit Puree | 35.6 |
| Wheat Flour | 11.4 |
| Water | 52.4 |
| Xanthan Gum | 0.43 |
| Sodium Citrate | 0.17 |

This product was pre-mixed on the bench top in the laboratory and was deposited using a hand press. The product was allowed to gel and set for one hour, and the end result demonstrated a product of high gelling and product elasticity with uniform matrix.

EXAMPLE 3

| Ingredients | Amount (wt-%) |
|---|---|
| Corn Syrup, High Solids | 10.45 |
| Quick Cooking Oat Flour | 13.65 |
| All Purpose Wheat Flour | 9.85 |
| Fruit Bits (micro), Dry | 16.80 |
| Prune Puree | 25.50 |
| Pre-gelled Wheat Starch | 7.55 |
| Apple Juice Concentrate | 6.50 |
| Corn Oil | 2.05 |
| Salt | 1.25 |
| Flour | 0.20 |
| Sucrose Sugar | 6.20 |

The above recipe was made on a bench top forming extruder (homemade), with cooking of the particles after forming and heating to the order of 295° F. for 15 minutes in a home oven. The resulting product exhibited very good chewy and leathery characteristics, with good textural structure and a continuous matrix. The final moisture content of the product was about 31%, and was not as stable when room humidity changed.

EXAMPLE 4

| Ingredients | Amount (wt-%) |
|---|---|
| Fruitrim ® | 25.55 |
| Oat Flour | 15.05 |
| Wheat Flour | 7.52 |
| Soya Flour | 10.83 |
| Fruit Bits (micro) | 20.85 |
| Pregelled Wheat Starch | 5.35 |
| Concentrated Fruit Juice | 7.50 |
| Salt | 0.55 |
| Sucrose Sugar | 6.35 |
| Flavor | 0.25 |
| Xanthan Gum | 0.20 |

The above ingredients were treated in a twinscrew extruder as in Example 1. The resulting product had a very strong leathery texture after being heated and dehydrated to approximately 27% moisture. Other tests were conducted with the inclusion of meat-by-products, soy flour, sugar, cane molasses, dextrose, and salt, at varying concentrations to provide a leathery or jerky type texture.

It is understood that since the mixture is heated to above the starch gelatinization point of 83° C. or 180° F. in the presence of water, the matrix is formed and becomes continuous. By holding the moisture within the matrix in the presence of fats and humectants the glass transition points of the components of the matrix are reduced dramatically. Under normal conditions, these components of the matrix outside of the matrix at room temperature are not necessarily in an amorphous phase. It is only due to the combined binding effect of moisture within the matrix that each component stays in an amorphous state, due to the lowering of the glass transition point.

From the information we have gathered on bench top processes, the use of a twin screw extruder can be modified to optimize the textural development of all of the above recipes.

EXAMPLE 5

Using FruitSource®, supplied by Fruit Source Associates, Santa Cruz, Calif., the following three formulae were tested. Note: FruitSource® has a water activity of 0.2 and a glass transition temperature of −18.5° C. The final glass transition temperature for all of the following three recipes are in the range of +4° to +18° C.

| | Formula #1 | Formula #2 | Formula #3 |
|---|---|---|---|
| FruitSource ® | 73.0% | 60.5% | 57.0% |
| Pre-gelled Starch | 12.5% | 8.0% | 10.0% |
| Unbleached, All-Purpose Flour | 8.0% | 12.0% | 8.0% |
| Flavoring | 2.5% | 2.5% | 2.5% |
| Sugar | 4.0% | 0 | 14.0% |
| Concentrated Fruit Juice | 0 | 17.0% | 8.5% |

EXAMPLE 6

A set of trial food products were prepared using the extrusion method above-described at a cooking temperature between about 175°–250° F. on the following recipes and within the wt-% ranges provided.

| | |
|---|---|
| Protein source from Egg, Potato, and/or Animal tissue | 16–55% |
| Vitamin and Mineral Mix | 2–7% |
| Modified cereal starch as a matrix builder | 4–12% |
| Sunflower oil | 2–12% |
| Cellulose as an inclusion | 0–5% |
| Flavorings | 0.5–3% |
| Fruit Juice Concentrate | 28–55% |

Based on the above levels of concentration, a wide variety of products were achieved that imparted a hard texture to a very soft, moist, and pliable texture with excellent flexibility and stability at room temperature after 24 hours of air drying, with no packaging. It was estimated that the above results were achieved in a room with relative humidity of 45%. The most desirable formula included over 40% exposure to open atmosphere. A test on honey as a binding agent was also conducted at 45% concentration, and it was found to be an excellent ingredient for such a product.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for producing a semi-moist pet food or treat product having a flexible or jerky-like characteristic with a chewy or leathery texture consisting essentially of carrying out in a twin-screw, self-wiping, co-rotating and intermeshing extruder the steps of:

(a) kneading a mixture comprising a filler, a hydrocolloid and a liquid binder having a glass transition temperature of less than about +10° C. at a temperature of about 175° to 250° F.;

(b) venting off under reduced pressure water and volatiles;

(c) cooling the dough-like mixture to about 0° to 150° F., and (d) conveying the product through a die onto a conveyor belt for cutting and packaging;

wherein the product has a moisture content of about 20 to 40%; a water activity (Aw) of about 0.35–0.65, and a glass transition temperature of less than about +18° C.

2. The method of claim 1, wherein a flavoring source is added to the dough-like mixture following the venting step (b).

3. The method of claim 1, wherein the liquid binder is added to a mixture of filler and hydrocolloids at a temperature of about 70° to 220° F., then heated to a temperature of about 150° to 250° F.

4. The method of claim 1, wherein the dough-like mixture from step (a) comprises:

(i) about 9–28 wt-% of the filler comprising about 3–12.5 wt-% amylose based on the total weight of the product;

(ii) about 0.5–4 wt-% of the hydrocolloid, and (iii) about 60–89.4 wt-% of the binder.

5. The method of claim 2, wherein about 0.1 to 3 wt-% of a flavoring source is added.

* * * * *